May 15, 1928. 1,669,800

F. ALEXANDER

TYPEWRITER

Filed June 15, 1925 7 Sheets-Sheet 1

Inventor

By Frederick Alexander

May 15, 1928.  F. ALEXANDER  1,669,800
TYPEWRITER
Filed June 15, 1925   7 Sheets-Sheet 2

Inventor
By Frederick Alexander

May 15, 1928.

F. ALEXANDER

TYPEWRITER

Filed June 15, 1925

Inventor

By Frederick Alexander

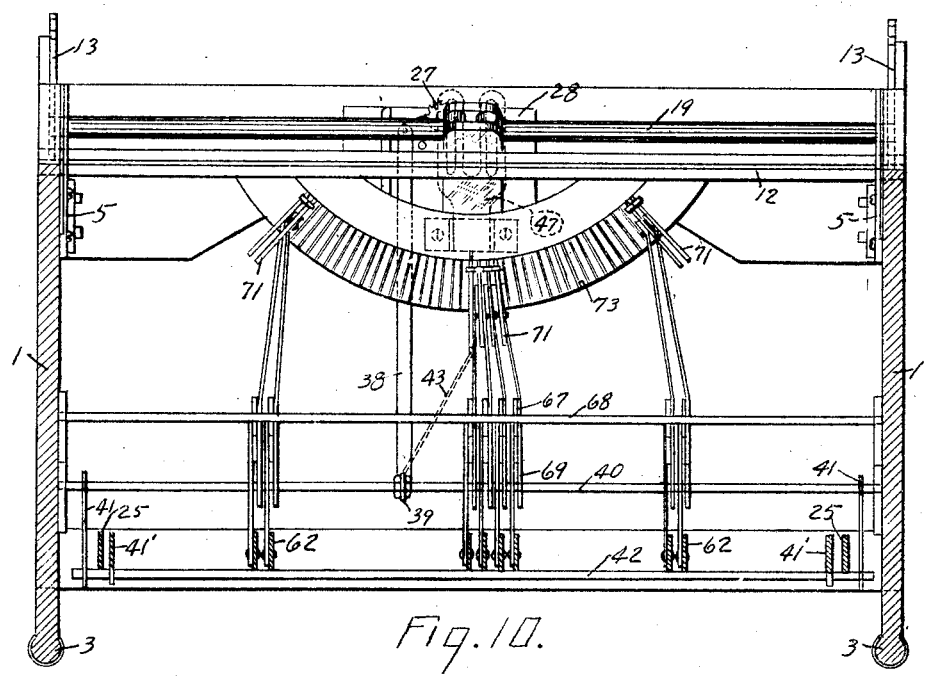
Fig. 10.
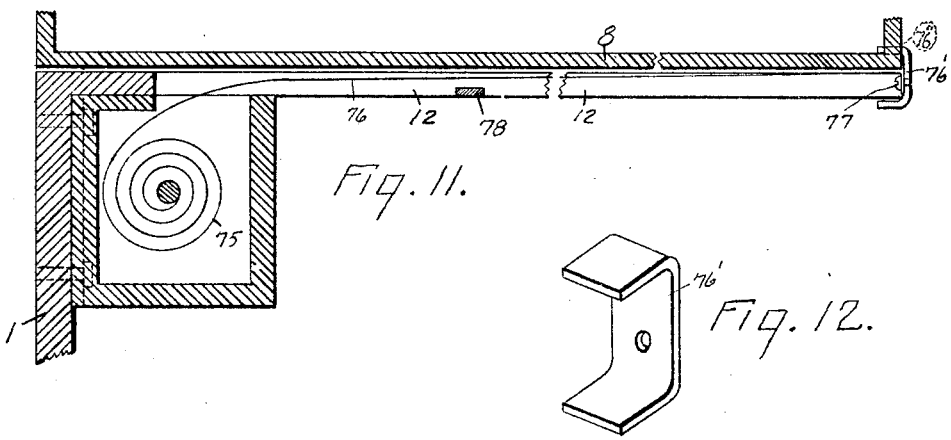
Fig. 11.
Fig. 12.
Inventor
By Frederick Alexander

May 15, 1928.
F. ALEXANDER
TYPEWRITER
Filed June 15, 1925     7 Sheets—Sheet 5
1,669,800
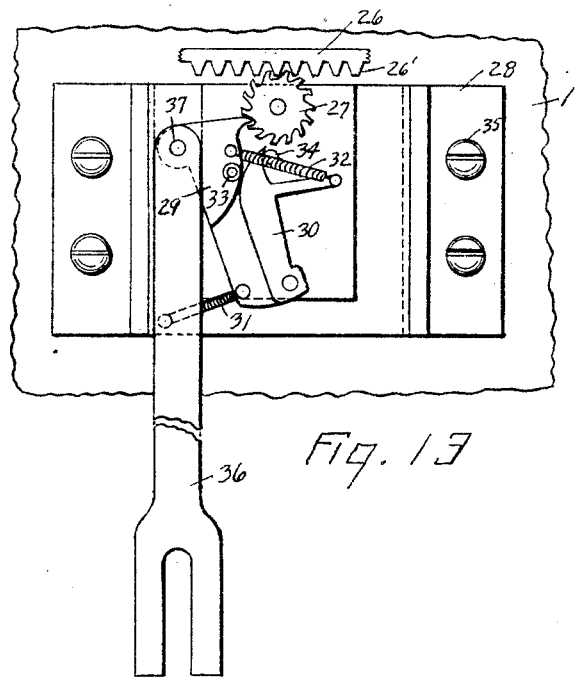
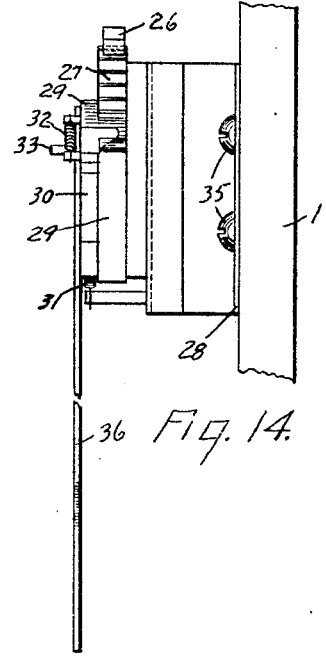
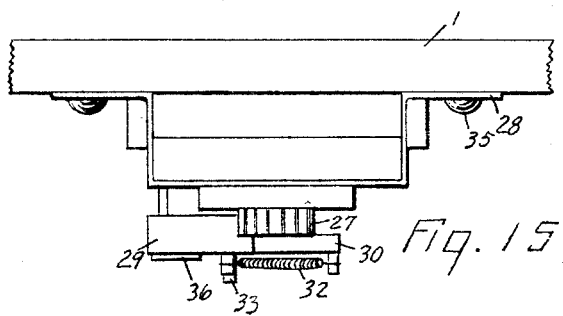
Inventor
By Frederick Alexander

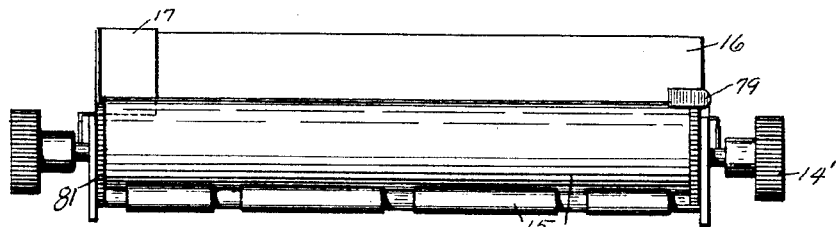
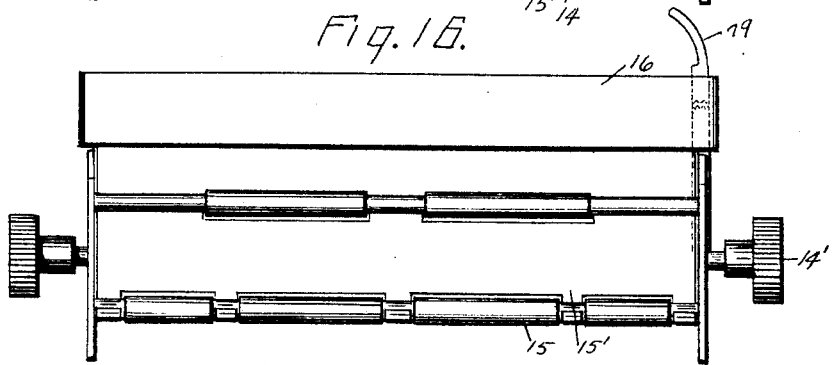
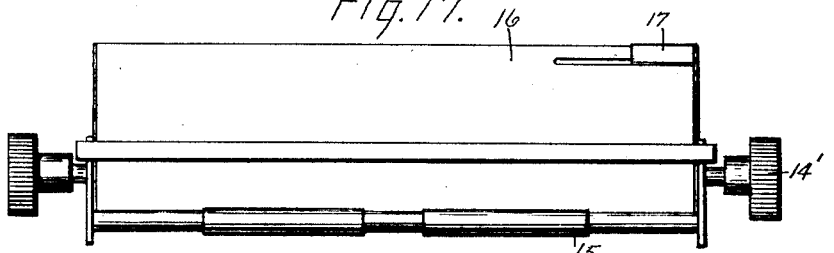
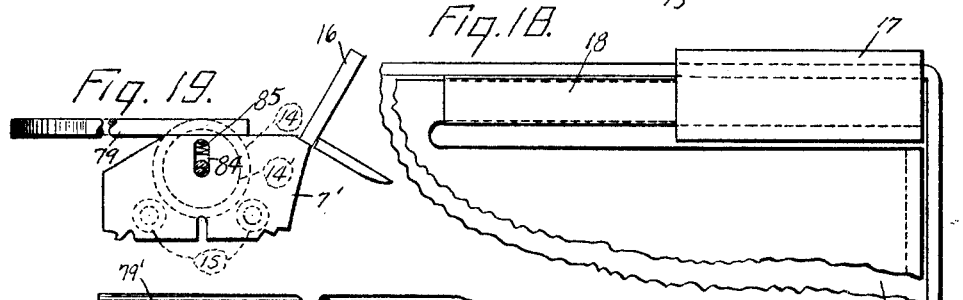

Patented May 15, 1928.

1,669,800

UNITED STATES PATENT OFFICE.

FREDERICK ALEXANDER, OF EAST ST. LOUIS, ILLINOIS.

TYPEWRITER.

Application filed June 15, 1925. Serial No. 37,246.

This invention relates to improvements in typewriting machines, and more particularly to the construction and mounting of the carriage and associated parts. There is provided a travelling carriage which has mounted therein a platen carriage, both of said carriages being readily removable. The carriage is also mounted for movement for case shift purposes and is provided with paper feed mechanism and a carriage return and line space lever all intimately associated with the carriage.

The invention hereinafter claimed is illustrated and described as embodied in a full sized typewriting machine of a particular character, but features of the invention are applicable to typewriting machines of other types and parts of the invention may be employed alone or in connection with other machines.

In the drawings:

Figure 10 is a transverse section on the line 10 of Figure 5 with parts omitted and parts in dotted lines.

Figure 11 is a transverse section showing the carriage driving spring and its attachment to the carriage.

Figure 12 is a perspective view of the removable carriage engaging element shown in Figure 11.

Figure 13 is a front elevation of the escapement mechanism.

Figure 14 is a side elevation of the same.

Figure 15 is a top plan of the same.

Figure 16 is a front elevation of the platen carriage.

Figure 17 is a bottom plan of the same.

Figure 18 is a rear elevation of the same.

Figure 19 is a side elevation of the same.

Figure 20 is a top plan of the carriage return and line space lever.

Figure 21 is a side elevation of the same showing a portion of the line space wheel.

Figure 22 is a rear elevation on an enlarged scale of a portion of the paper table with the paper gauge.

Figure 1:
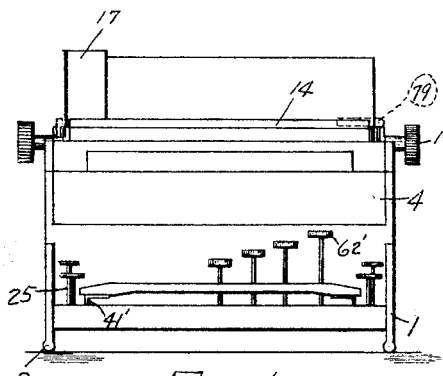
Figure 1 is a front elevation of the typewriting machine, showing the carriage return lever in dotted lines and only a portion of the keyboard.
Figure 2:
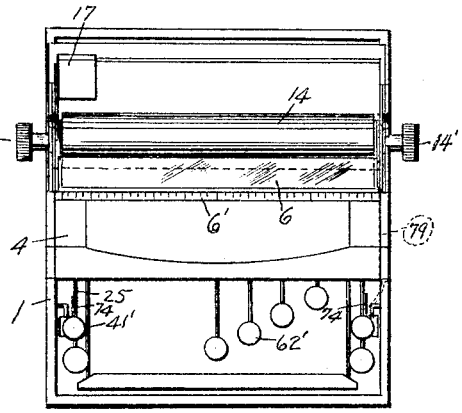
Figure 2 is a top plan view of the device shown in Figure 1.
Figure 3:
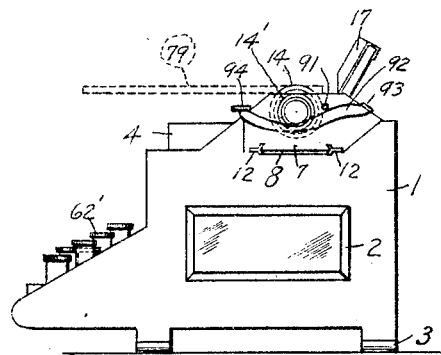
Figure 3 is a side elevation of the same.
Figure 4:
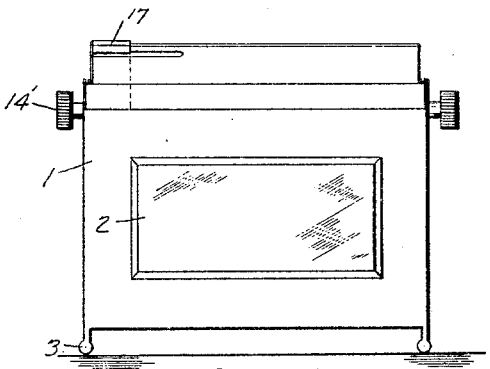
Figure 4 is a rear elevation of the same.

The frame 1 of the machine may be of any desired material and similar to the usual and common constructions of typewriter frames. Its sides and rear are provided with beveled rectangular panels 2 of glass or other transparent material which will prevent the access of dust to the interior of the machine but permit observation thereof. The frame is supported by the usual rubber feet 3 which may be of any desired construction.

A shell shaped sheet metal cover 4 which is intended to inclose the front of the machine has depending portions engaged by lugs 5 on the inside of the frame 1 (see Figure 10). The lower portion of this cover is slotted as at 4' for the up and down movement of the key levers, and the cover overlies the entire front of the frame inclosing the type bars, ribbon mechanism, etc. The upper edge of this cover carries a thin glass or other transparent panel 6 parallel with the customary graduated scale 6'. This member 6 also acts to press the paper against the front of the platen.

Figure 6:
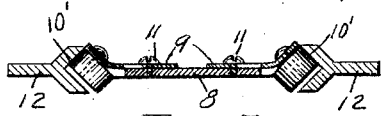
Figure 6 is a section on the line 6 of Figure 5.
Figure 7:
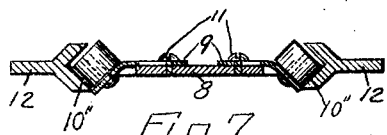
Figure 7 is a section on the line 7 of Figure 5.
Figure 8:
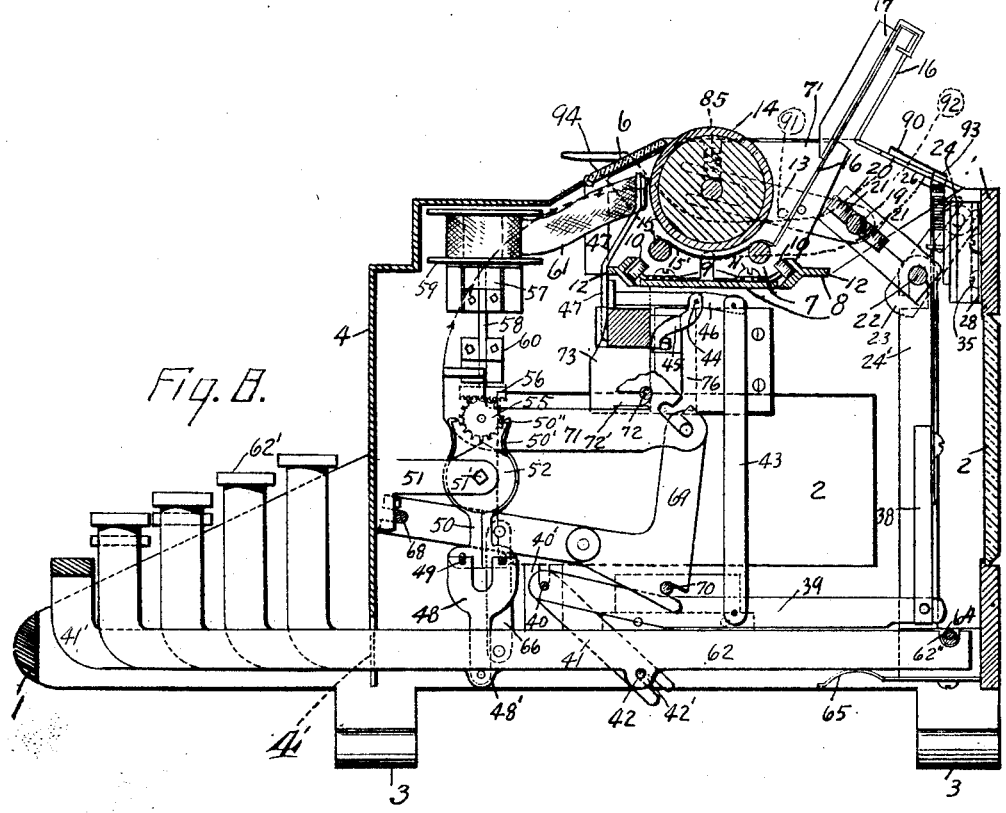
Figure 8 is a fore and aft section on the line 8 of Figure 5.

The carriage 7 which is adapted to travel from side to side of the machine has a base 8 on which are adjustably mounted the holders 9 for the roller bearings 10. The holders are provided with elongated slots 9' through which pass screws 11, thus permitting transverse adjustment. Rigidly supported by the frame of the machine are bearing ways 12 which are V-shaped and with which are adapted to engage the rollers 10. As shown in Figure 6, certain of the holders are mounted in such position that the rollers 10' will engage the inside of the upper branch of the V, while as shown in Figure 7, other holders are mounted in reverse position so that the rollers 10'' carried thereby engage the inside of the lower branch of the V. In this manner the carriage is held firmly in position but allowed to travel freely.

The axle of the platen 14 is detachably held at either end in the forked bars 13 so that the platen carriage may be removed by raising the same and moving the platen axle out of the forks of the bars 13. The platen axle is provided at either end with the usual finger knobs 14′ for turning the same.

The platen carriage 7′ also has rigidly mounted therein feed rollers 15 which lie closely adjacent the platen. A paper apron 15′ of the same curvature as the platen extends between and is attached at its ends to the feed rollers 15, or rather to the shafts supporting the same. The platen carriage has mounted therein the usual upwardly and rearwardly extending paper table 16 provided with an edge gage 17 having a portion bent to extend through a slot in the paper table and held in position by a leaf spring 18 (see Figure 22).

The forked bars 13 are pivoted to the sides of the carriage and at their rear ends are connected to a rod 19 the ends of which are mounted in the main carriage. A block 20 is fitted with roller bearings 21 engaging each side of the rod 19. To the lower side of the block is connected a rod 22 which is carried at its ends by short forked links 23 pivoted for movement on bearing studs 24. A hooked link 24′ connects the forked links 23 with the shift key levers 25.

Figure 5:
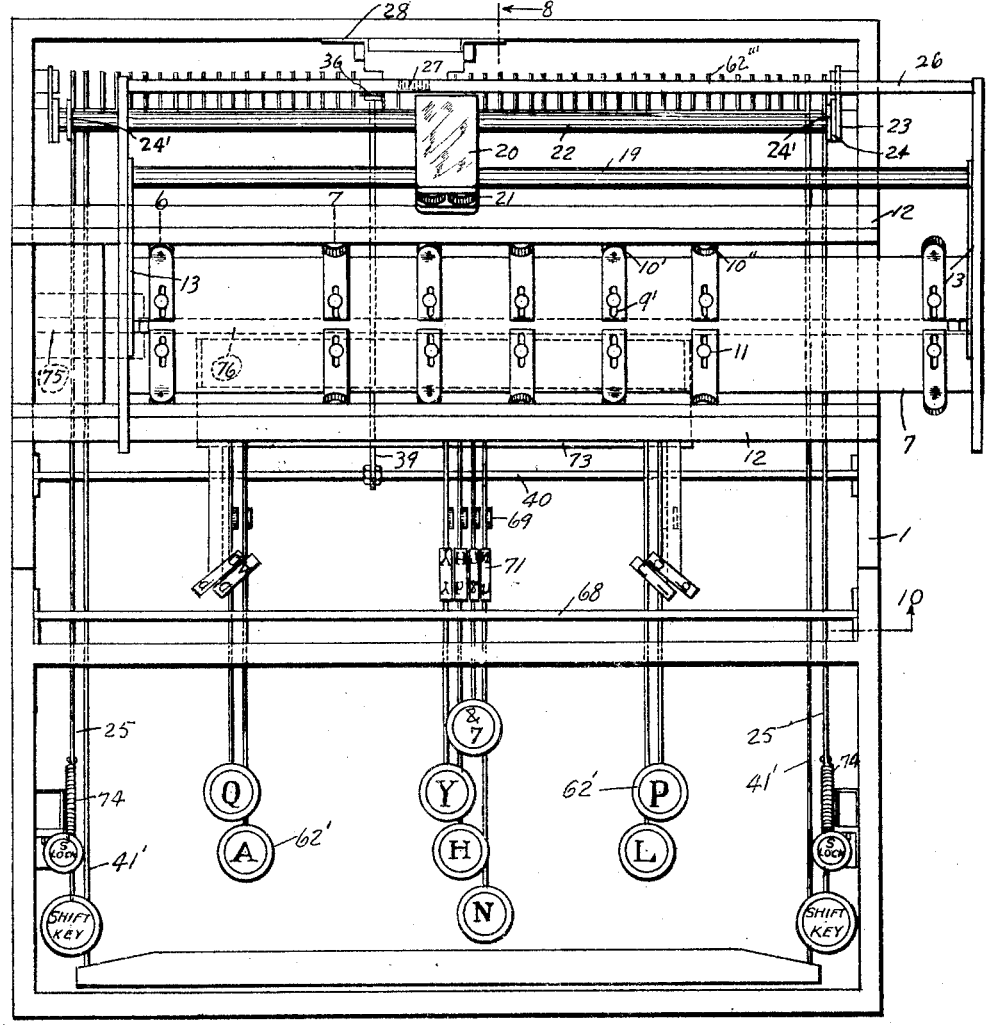
Figure 5 is a top plan view on an enlarged scale, with the platen carriage removed.

The shift key levers are provided with the usual keys as well as with lock keys (Fig. 5) which are drawn to one position by springs 74. It is obvious that an actuation of a shift key or lock key will result in rocking the shaft 19 with the arms 13 and thereby moving the platen to upper case position. This will take place regardless of the longitudinal position of the carriage due to the travelling connection between the rod 19 and the block 20.

To control the letter space movement of the carriage, it is provided with a rack bar 26 and having teeth 26′ on its under edge which engage with an escapement wheel 27. The escapement wheel is mounted in a support 28 fastened by screws 35 or equivalent means to the front side of the rear wall of the frame 1. The carriage is normally urged toward the left by spring mechanism hereinafter described and the step by step movement of the escapement wheel 27 is controlled in the following manner.

A pawl 29 is mounted for pivotal movement about a pin 33 carried by the base 28 and this pawl normally engages the teeth of the escapement wheel 27, and is held in such position by a spiral spring 31 attached at one end to the pawl and at the other end to a fixed part as shown in Fig. 13. A second or auxiliary pawl 30 is pivoted near one end to one end of the main pawl and a spring 32 attached at one end to an arm of the auxiliary pawl and at its other end to the main pawl draws the former against a shoulder of the latter. Movement of the pawl 30 in the other direction is limited by a stop 34.

A lever 36 is pivoted to the main pawl 29 at 37 and through a bar 38 is connected to a bent link 39 fast at one end to a rock shaft 40 supported at its ends in bearings 40′ in the frame 1. The bar 40 also carries arms 41 which support a universal bar 42 which underlies all the key levers 62 and also fits in slots 42′ on the underside of space bar levers 41′, so that a depression of any key lever or the space bar will rock the rod 40 and through the connections just described will pull down on the link 36.

This will move the pawl 29 out of engagement with the teeth of the escapement wheel 27 but at the same time the pawl 30 guided between the stop 34 and the main pawl 29 will move into engagement with the wheel 27 and hold the same against movement. Upon release of the depressed key, the link 36 will move upward and the spring 31 will move the main pawl 29 back into engagement with the wheel but at a space subsequent to that previously engaged, thus allowing the carriage to move one step. The engaging ends of both pawls are so curved with relation to their movement and the teeth of the wheel, that they move into engagement therewith without causing the usual clicking movement and therefore the operation of the escapement is silent.

It is necessary that the ribbon 61 be vibrated over the printing point each time that a key lever is depressed, and this is achieved in the following manner. The ribbon passes through the upper end of a ribbon vibrator 47 which is connected at its lower end to one end of a lever 46 pivoted intermediate its ends at 44 to a curved bracket 45 supported by the machine frame. The other end of the lever 46 is connected by a link 43 to the bent link 39 above described which is rocked each time a key lever is depressed. In this manner the lever 46 will also be rocked and the ribbon vibrator 47 moved to bring the ribbon 61 over the printing point.

In order to feed the ribbon from one spool to the other, the following construction is employed. A shaft 54 passes underneath all of the key levers 62 and is supported at its ends in the space bar levers 41′. A link 48 is U-shaped at one end and has its opposite end connected to the shaft or bar 54. The U-shaped end of this link 48 has a pin 49 in each branch which passes through slots 49′ in a standard 50. This standard is extended in the form of two thin leaf springs 50′ which terminate in hooks 50″ which are adapted to engage a pinion 55. These springs 50′ partially encircle a disc 52 which is circular through the greater portion of its periphery and this disc is supported by a forked bracket 51. The bracket 51 has a shaft 51′ which is non-circular in cross section, and passes through the disc 52 so that the latter is held against rotation.

The pinion 55 is supported rigidly on a shaft 53 which carries at its outer ends pinions 55′ meshing with crown wheels 56 on the lower ends of ribbon spool shafts 58 supported in brackets 57 and 60, the upper bracket 60 also supporting the ribbon spool. Whenever a key is actuated the link 48 will be pulled downward and the spring pawl 50′ which is in engagement with the wheel or pinion 55 will rotate the same and feed the ribbon from one spool to the other. When the ribbon 61 is entirely wound on one spool, a subsequent depression of a key with movement of the link 48 will rock the standard 50 about the disc 52 disengaging the pawl 50′ which has been operative and engaging the opposite pawl 50′ which will then operate to feed the ribbon in the opposite direction.

Figure 9:
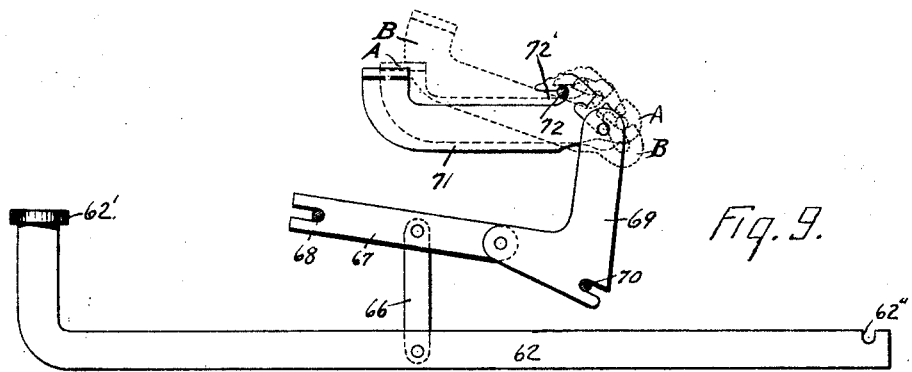
Figure 9 is a side elevation of a single type action, showing in dotted lines the manner of removing the type bar.
Figure 23:
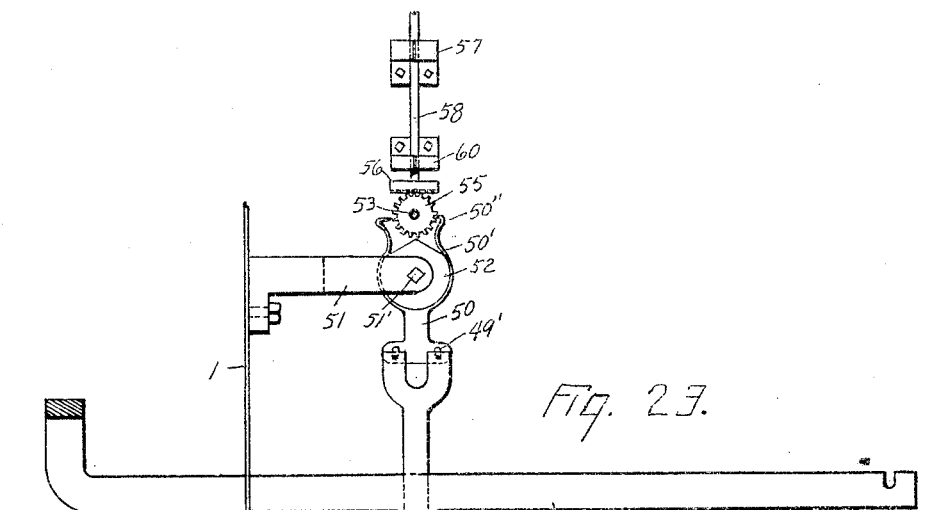
Figure 23 is a side elevation of the ribbon feed mechanism.
Figure 24:
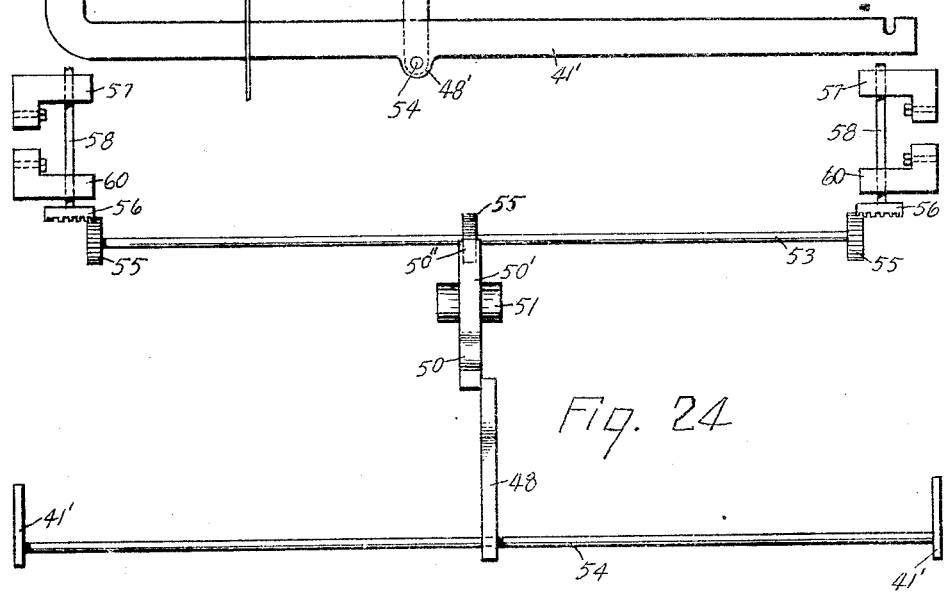
Figure 24 is a front elevation of the same.
Figure 25:
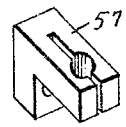
Figure 25 is a detail view of a bracket for holding the ribbon shaft.

The key levers 62 are provided with the usual finger pieces 62′ and have notches 62″ at their rear ends engaging a fulcrum rod 64. A spring 65 underlies each key lever near its fulcrum point and returns it to normal position. To an intermediate point of the key lever is pivoted a short link 66 the other end of which is pivoted to a lever 67 having a slotted end engaging a guide rod 68. The other end of the lever 67 is pivoted to a bell crank lever 69 having a slot near the heel thereof engaging a rod 70. The type bars are fulcrumed on a rod 72 carried by a segment 73 and each bar has an open slot 72′ engaging said rod 72. The upper end of the lever 69 carries a pin engaging in a slot in the heel of the type bar, this slot having an open portion permitting easy removal and replacement of the type bar as indicated by dotted lines in Figure 9.

To draw the carriage toward the left under control of the escapement mechanism, the following construction is employed. A band spring 75 is wound in helical manner in a casing and is connected to a flexible band or tape 76 which at its extremity is provided with a U-shaped member 76′ by means of a screw 77. This member 76′ normally engages a slot 76″ in the end of the carriage and therefore draws the carriage toward the left under the control of the escapement mechanism. When it is desired to remove the carriage it is moved further to the left and the hook 76′ will engage a cross bar 78 and become detached from the carriage which can thus be removed endwise without releasing the spring. When the carriage is next placed in position and moved to the right, the slot 76″ will engage the hook 76′ and thereby again connect the driving spring to the carriage.

Since the feed rolls 15 are rigidly mounted in the carriage frame it is necessary to make some provision for feeding paper or envelopes of different thicknesses. Accordingly the sides of the platen carriage are provided with slots 84 through which pass the platen shaft and a small coil spring 85 at each side bears against the top of the shaft. When thick paper or envelopes or the like are fed into the machine, these springs will yield and provide for sufficient space between the feed rolls 15 and the platen.

A combined line space and carriage return lever 79 shown in Figures 16 to 21 has a vertical pivot 79′ adapted to fit into an opening at either side of the carriage frame. This enables the lever to be placed at either side according to whether the operator desires to use the right or left hand for returning the carriage. A pawl 80 is carried by this lever in position to engage a ratchet wheel 81 fixed with the platen, and thereby rotate the platen step by step.

It is obvious that some features of the invention may be used without others and that the precise physical embodiment of the invention may be modified widely without in any way departing from the spirit of the invention, which is to be regarded as limited only by the scope of the appended claims.

I claim:

1. In a typewriting machine, the combination of a main frame, a main carriage longitudinally movable therein, a supplemental carriage shiftably mounted on the main carriage, a platen having the usual spindle mounted in the supplemental carriage, and a mounting for said spindle permitting yielding movement of the platen relatively to the supplemental carriage.

2. In a typewriting machine, the combination of a main frame, a main carriage longitudinally movable therein, a supplemental carriage shiftably mounted on the main carriage, a platen having the usual spindle mounted in the supplemental carriage, fixed feed rolls underlying the platen, and means permitting the platen to move in the supplemental carriage away from the feed rolls when thick work-sheets are employed.

3. In a typewriting machine, the combination of a main frame, a main carriage longitudinally movable therein, a supplemental carriage mounted for case shift in the main carriage, a platen carried thereby, feed rolls and a paper apron underlying the platen and rigid with the supplemental carriage, and a mounting for the platen permitting it to yield away from the feed rolls when thick worksheets are employed.

4. In a typewriting machine, the combination of a main frame, a main carriage longitudinally movable therein, fixed V-shaped guides carried by the main frame, a series of rollers carried by the carriage base and alternately engaging upper and lower sides of the V-shaped guides, and means permitting adjustment of each roller independently.

5. In a typewriting machine, the combination of a main frame, a main carriage longitudinally movable therein, a supplemental carriage supported by the main carriage and movable therein for case shift, a cover plate for the front of the machine, and a transparent panel carried thereby and having its upper edge close to the platen so that the writing is read through said panel.

6. In a typewriting machine, the combination of a main frame, a main carriage longitudinally movable therein, a supplemental carriage movably mounted for case shift in the main carriage, feed rolls rigidly mounted in the supplemental carriage, a platen above said feed rolls, and a transparent panel at the front of the platen overlying the printed line and assisting to hold the worksheets in position.

7. In a typewriting machine, the combination of a main frame, a main carriage longitudinally movable therein, a supplemental carriage movably mounted for case shift in the main carriage, feed rolls rigidly mounted in the supplemental carriage, a platen above said feed rolls, means permitting the platen to move away from the feed rolls when thick worksheets are employed, and a transparent panel at the front of the platen overlying the printed line and assisting to hold the worksheets in position.

8. In a typewriting machine, the combination of a main frame, a main carriage longitudinally movable therein, a supplemental carriage movably mounted for case shift in the main carriage, a platen carried by the supplemental carriage and having a ratchet wheel at each end, a carriage return and line space lever, and a mounting for said lever at each end of the carriage.

In testimony whereof I hereunto affix my signature.

FREDERICK ALEXANDER.